United States Patent
Schlichter (10) Patent No.: US 8,224,401 B1
(45) Date of Patent: Jul. 17, 2012

(54) SYSTEM AND METHOD FOR CONTROLLING A POWERED DEVICE THAT DRAWS POWER FROM A COMMUNICATIONS NETWORK IN RESPONSE TO USER DETECTION

(75) Inventor: Timothy J. Schlichter, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 387 days.

(21) Appl. No.: 12/689,722

(22) Filed: Jan. 19, 2010

(51) Int. Cl.
*H04B 1/00* (2006.01)
*H04B 1/04* (2006.01)

(52) U.S. Cl. .................. 455/574; 455/127.1; 455/127.5

(58) Field of Classification Search .................. 455/574, 455/127.1, 127.5, 456.1, 422.1; 379/900
See application file for complete search history.

(56) References Cited

U.S. PATENT DOCUMENTS

| | | | |
|---|---|---|---|
| 6,115,468 A * | 9/2000 | De Nicolo | 379/413 |
| 6,996,458 B2 | 2/2006 | Pincu et al. | 700/297 |
| 7,483,964 B1 * | 1/2009 | Jackson et al. | 709/221 |
| 7,548,799 B2 * | 6/2009 | Landry et al. | 700/297 |
| 7,756,544 B1 * | 7/2010 | Graham | 455/522 |
| 8,049,484 B2 * | 11/2011 | Vetteth | 323/355 |
| 8,064,179 B2 * | 11/2011 | Apfel | 361/90 |
| 2007/0041387 A1 | 2/2007 | Ghoshal et al. | 370/395.52 |
| 2007/0081553 A1 | 4/2007 | Cicchetti et al. | 370/466 |
| 2008/0082594 A1 | 4/2008 | Soltes et al. | 707/204 |

* cited by examiner

*Primary Examiner* — Sonny Trinh
(74) *Attorney, Agent, or Firm* — Allen, Dyer, Doppelt, Milbrath & Gilchrist, P.A.

(57) ABSTRACT

A system and method controls a powered device of the user that is connected to a communications network and draws power therefrom. A determination is made if the user is in the vicinity of the communications network by generating a probe packet to a wireless access point (WAP) of the communications network that is returned positive when a wireless communications device of the user that is configured to connect to the communications network via the WAP is connected thereto. If the probe packet is returned positive indicative of the presence of a user, the network switch port of a network switch connected to the powered device of the power is enabled to allow the powered device to draw power from the communications network. The network switch port is disabled when the probe packet is returned negative indicative that the user is not in the vicinity of the communications network.

31 Claims, 4 Drawing Sheets

SYSTEM AND METHOD FOR CONTROLLING A POWERED DEVICE THAT DRAWS POWER FROM A COMMUNICATIONS NETWORK IN RESPONSE TO USER DETECTION

FIELD OF THE INVENTION

This invention relates to communications systems, and more particularly, this invention relates to powered devices such as IP telephones and similar network devices that draw power from a communications network such as using Power over Ethernet (PoE) technology.

BACKGROUND OF THE INVENTION

An Internet Protocol (IP) communications network typically includes a large number of routers, switches and/or similar network elements and devices, for example, user terminals such as Voice over IP (VoIP) phones. In an example, some network switches include switch ports, for example, such as provided on the NetVanta series of switches and devices as manufactured by ADTRAN, INC. of Huntsville, Ala. These network elements often use Power over Ethernet (PoE) technology to pass electrical power along with data on Ethernet or similar cabling for use by remote devices over typically standard twisted-pair cable on an Ethernet network.

In these examples, an office IP phone or similar powered device that belongs to the user draws power using Power over Ethernet technology and consumes bandwidth and power even when the user is not in the office or in the vicinity or environment of the network. In those circumstances, the IP phone or similar powered device connected to the network does not require full power since the user is not in the presence of the communications network and will not require the IP phone or powered device. This IP phone or powered device as connected to the network switch or other network element uses Power over Ethernet technology to transfer the electrical power along with the data to the IP phone (and/or other powered device) in the network.

In a particular example, an IP phone connected in one communications network draws power from the communications network using PoE and consumes power 24 hours a day and 7 days a week. Just one network switch in this example can have 24 ports with Power over Ethernet technology and deliver 15 watts for each of the 24 ports for a total of 400 watts total. This is a large amount of power that is wasted if no users are available at the company or other premises, such as in the middle of the night. As the national and international community and economy becomes increasingly concerned about "going green," it becomes increasingly important to save power whenever possible.

SUMMARY OF THE INVENTION

A system and method controls a powered device of the user that is connected to a communications network and draws power therefrom. In a non-limiting aspect, a determination is made if, the user is in the vicinity of the communications network by generating a probe packet to a wireless access point (WAP) of the communications network that is returned positive when a wireless communications device of the user that is configured to connect to the communications network via the WAP is connected thereto. If the probe packet is returned positive indicative of the presence of a user, the network switch port of a network switch connected to the powered device is enabled to allow the powered device to draw power from the communications network. The network switch port is disabled when the probe packet is returned negative indicative that the user is not in the vicinity of the communications network.

The network switch having the network switch port to which the powered device of the user is connected generates the probe packet in one non-limiting example. In another example, an administrator device could generate the probe packet. In another aspect, the network switch to which the powered device is connected comprises an Ethernet switch. The powered device draws power from the switch port using Power over Ethernet (PoE) functionality. In another aspect, the powered device of the user comprises an internet protocol (IP) phone.

In another aspect, the switch port is enabled and disabled based on a track state in the network switch to which the power device is connected. A TRUE track state in the network switch enables the switch port when a probe packet is returned positive. A FALSE track state in the network switch disables the switch port when the probe packet is returned negative. In another aspect, the packet probe is generated on a repeated interval that is user configurable.

In another aspect, the communications network comprises Internet protocol (IP) network and the powered device of the user comprises an IP phone. When a call for the IP phone of the user is received within the communications network, and the switch port has been disabled, the call is switched into a Private Branch Exchange (PBX) allowing the caller to leave a message. In another aspect, the call intended for the IP phone of the user can be forwarded to the mobile device such as using the PBX. In another aspect, the probe packet is generated on a repeated interval that is user configurable such that the probe packet can be transmitted every "n" seconds or minutes depending on user preferences or any network administrator preferences.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

Figure 1:
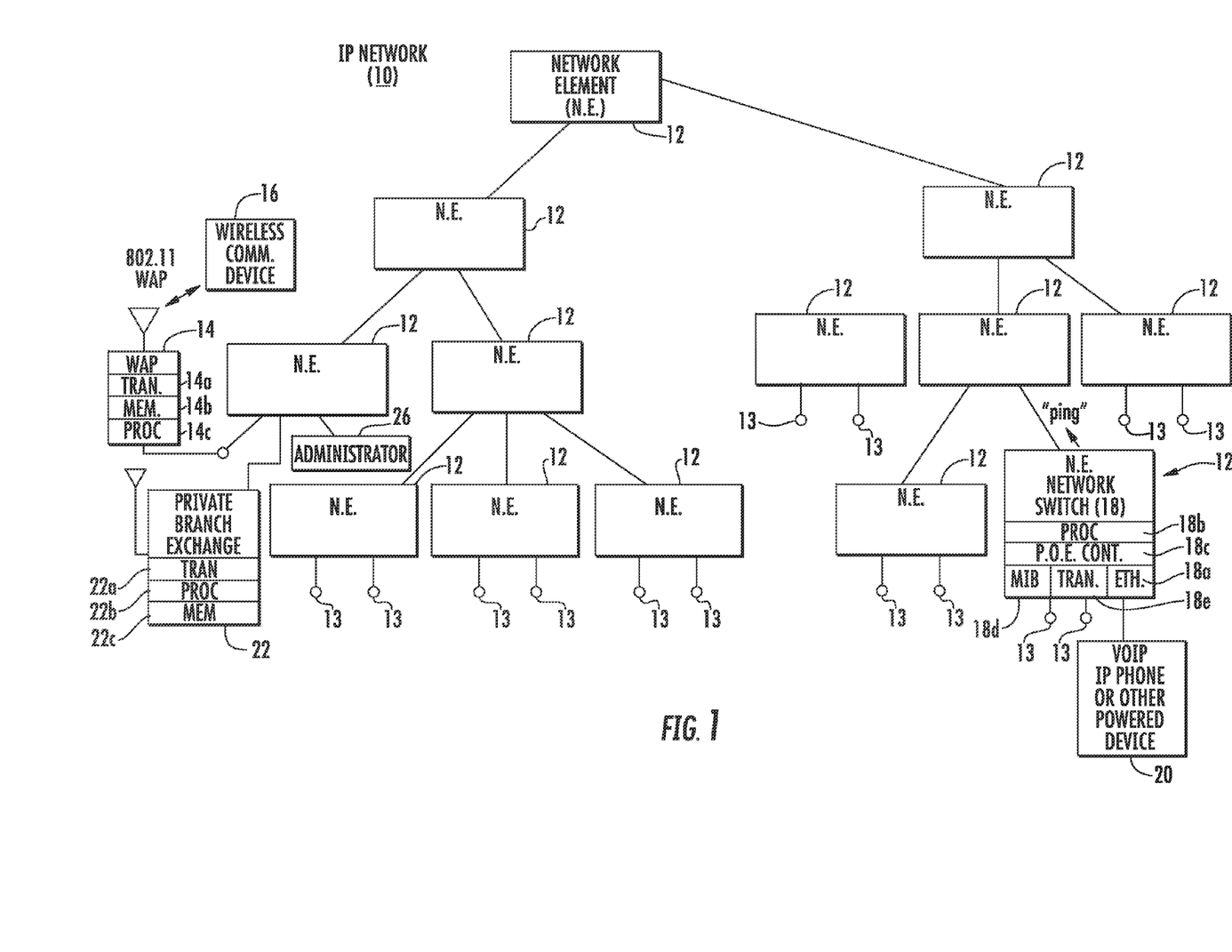
FIG. 1 is a high-level diagram of a communications system, in accordance with a non-limiting example, showing an Internet Protocol (IP) communications network and an IP phone as a powered device connected to a network switch as one of the network elements forming the network, wherein the network switch generates a probe packet as a "ping" to determine if a user carrying a wireless communications device is located in the vicinity of the IP communications network such that the switch port connected to that IP phone is disabled if the user is not in the network vicinity to save power.

In accordance with a non-limiting example, an IP phone or similar powered device is connected to a communications network such as an IP network and draws power through a switch port of a network switch using Power over Ethernet (PoE) technology. FIG. 1 shows a communications system as an IP network 10, in one non-limiting example, having a plurality of network elements 12 (N.E.) that form the network 10. Many of the network elements 12 connect to various user terminals 13 or other devices as illustrated. The network elements could be switches, routers and other devices. A Wireless Access Point 14, for example, an 802.11 Wireless Access Point (WAP), is connected to the network 10 and communicates with a user's wireless communications device 16, which in this example is a mobile phone. The network 10 includes at least one network element that is a network switch 18 that operates as a power sourcing network switch and uses PoE to power a powered device 20 connected thereto. In one example, the powered device 20 is an IP phone of the user or similar powered device and connected to the network for use by the user and draws power using Power over Ethernet technology.

The wireless access point 14 includes the functionality for 802.11 communications and includes communications circuits for operating in different protocols. These circuits include, for example, a transceiver 14a, memory 14b, and other circuits, including any processor 14c, necessary for operation. As also illustrated, a private branch exchange (PBX) 22 is connected to one of the network elements 12, which in this example is the same network element to which an administrator module 26 and the WAP 14 is connected. This PBX 22 in this non-limiting example also includes any necessary circuits such as a transceiver 22a, processor 22b and database or memory 22c, to allow any calls forwarded into the PBX to be forwarded to a wireless communications device in one example or stored in memory 22c.

As illustrated, the powered device 20 of the user is connected to a network switch 18, which in a non-limiting example can be connected to an Ethernet switch port 18a such as on a NetVanta switch manufactured by ADTRAN, INC. of Huntsville, Ala. as a non-limiting example. Basic components are illustrated such as a processor 18b and Power over Ethernet controller 18c and management information base 18d as typically used with many network elements. Other components include a transceiver 18e for communications within the network.

In one example, a probe packet is generated from the network switch 18 through the network and to the Wireless Access Point connected at the network to determine if the user carrying the wireless communications device 16 is located in the vicinity of the network. In one aspect, the switch port 18a connected to the IP phone or similar powered device 20 is disabled if the user is not in the vicinity to conserve power and network resources. The switch port 18a, on the other hand, is enabled if the user is in the vicinity.

In a non-limiting example, the presence of a user is detected by detecting the wireless communications device 16 of the user in the vicinity of the network. An action is taken if the presence of the user is not detected by shutting down the switch port 18a to the user IP phone or other powered device 20 when the user is not detected. When the user is detected, however, the switch port is enabled, allowing power to the powered device, i.e., in this example, the IP phone.

As shown in FIG. 1, the 802.11 Wireless Access Point (WAP) receives a "ping" or probe packet that has been network transmitted through the network such as originating from the network switch having the user's IP phone or other powered device 20 connected thereto and drawing power using Power over Ethernet technology. Of course, the administrator 26 or other network elements 12 could generate the "ping" or probe packet. If a user's wireless communications device 16 is detected, thus indicating the presence of the user or individual near or at the network, the switch port for the user's IP phone or other powered device is enabled. If the user's device 16 is not detected, typically indicating the user is not in the vicinity of the network (unless the device is turned off), the switch port for the IP phone or other powered device is disabled. The system works with the WiFi connection at the WAP and connected to the network.

Throughout this description, the IP phone is often described, but it should be understood that any powered device such as an IP phone can be used and a switch port enabled or disabled. As shown in FIG. 1, the IP phone (or similar powered device) is connected to the network as a PoE IP phone and does not power-up unless it receives power from the network, which in this example is a local area network. Therefore, disabling/enabling the IP phone is accomplished in this non-limiting example by disabling/enabling the switch port as an Ethernet port to which the IP phone is connected.

It should be understood that PoE technology is used to provide power to a variety of PoE network appliances, i.e., powered devices including but not limited to, IP phones, IP cameras, and Wireless Access Points (AP's). PoE is a cost effective and convenient method of powering devices such as the illustrated IP phone 20 in currently existing areas where upgrading the infrastructure is prohibited by a variety of factors. The system and method as set forth in accordance with a non-limiting example provides power efficiency and control.

The current PoE standard is governed by clause 33 contained in IEEE 802.3af (IEEE 802.3-2005), the disclosure which is hereby incorporated by reference in its entirety. The IEEE 802.af PoE standard provides up to 15.4 watts of DC power with a minimum of 44 VDC and 350 mA to each device. A new standard for IEEE 802.af PoE standard ratified Sep. 11, 2009 provides up to 25 watts of power.

PoE can be used in 10 Base-T and 100 Base-TX networks as well as in 1000 Base-T (gigabit Ethernet) applications due to a phantom power technique that allows power to be transmitted over data transmission wire pairs. PoE provides 48 VDC over two pairs of a CAT 3/CAT 5e Ethernet cable in on example. The maximum current of 400 mA provides a maximum load power of 15.4 watts prior to power losses within the system in the 802.af Standard.

The IEEE specification for PoE requires that at least two devices be present in the network for operation. These devices represent two different types, e.g., powered devices (PD's) and power sourcing equipment (PSE), for example, a network element as a switch and referred to as powered sourcing network switch in the example of FIG. 1. A powered device operates on power supplied by the power sourcing equipment rather than conventional means. Powered devices cover a broad range of network devices and can operate typically in one of two modes. The mode that is used is determined by the power sourcing equipment. The two modes differ in the wire pairs/pins used in the process. Mode A as a first mode uses pins 1, 2, 3 and 6, while mode B as a second mode uses pins 4, 5, 7 and 8. Consequently, mode B requires that a 4-pair cable be used. In order to indicate its compliance with IEEE standard 802.3af, a powered device typically places a 25 KO resistance between the powered pairs. In order to stay powered, typically the powered device uses 5-10 mA continuously for at least 60 ms with no greater than 400 ms since its last use.

In some examples, power sourcing equipment is classified as a midspan or endspan. A midspan functions as a power supply for the powered device and is placed between a non-PoE network switch and the powered device and has no effect on the data. An endspan combines an Ethernet switch with the necessary hardware to transmit PoE along with the data. Midspans are typically used when there is no requirement to add a new switch to the network, but rather to add PoE capability to an existing network.

A power management feature typically is included and measures in real time the total power used by connected powered devices. The difference in the total allocated power and the total available power from the unit is typically called the available power.

When a power management feature in a device detects a powered device connected to a port, it determines if there is enough available power based on the power budget requirement established for the powered device. Typically, the powered device will fall into one of five classes that dictate the maximum amount of power that it will use. For example, a powered device in an example uses resistance to indicate its power class to the power sourcing equipment. If the power requirement of the powered device is within the range of the available power on the power sourcing equipment, and the total allocated power is below the guard band (a value that serves as a buffer for the total allocated power), then power is not allowed on the port. If something causes the total allocated power to exceed the limit of the power sourcing equipment, then the power management feature begins shutting down the power to ports, starting with the highest port numbers, until it is below the threshold that the power sourcing equipment is capable of supplying.

Figure 2:
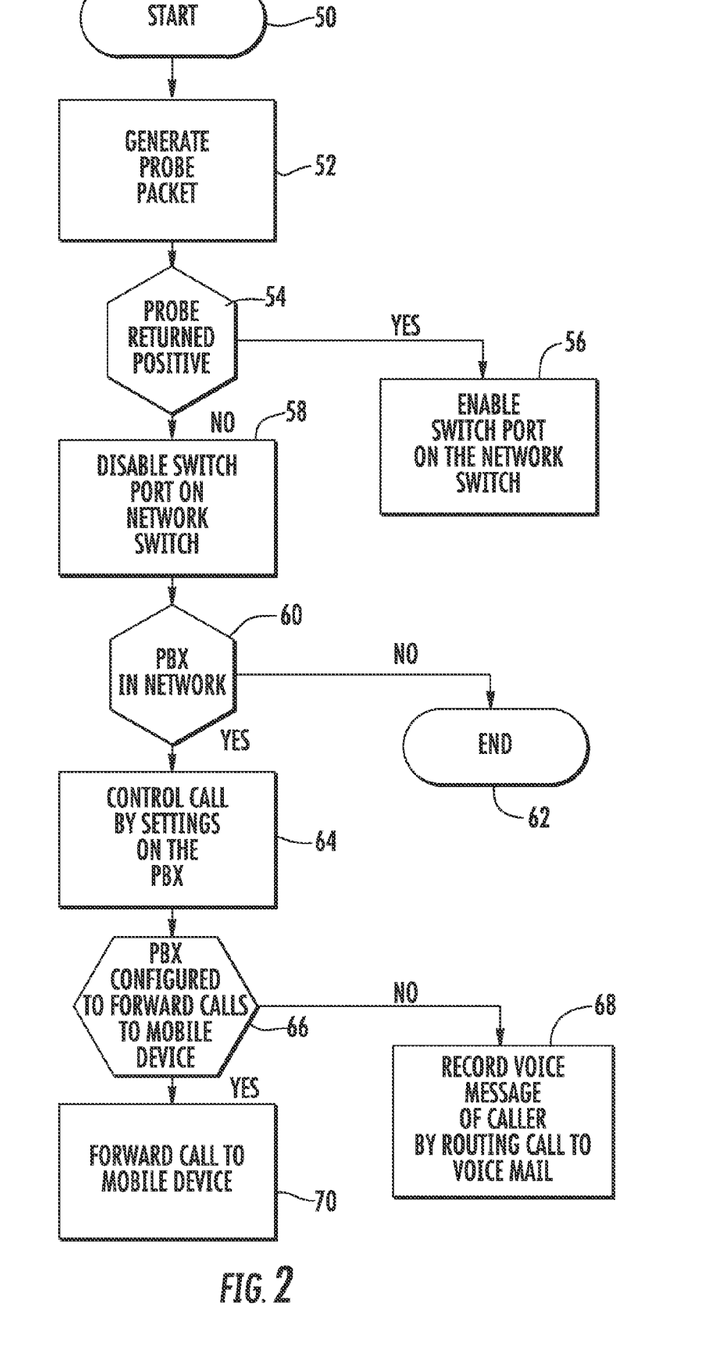
FIG. 2 is a high-level flowchart of an example method that can be used in accordance with a non-limiting example.

FIG. 2 is a high-level flowchart illustrating an example method in accordance with a non-limiting example. In this illustrated sequence of steps for the method, the process starts (block 50) by generating a probe packet (block 52). A determination is made if the probe packet is returned positive (block 54). If yes, the switch port on the network switch is enabled (block 56). If not, the switch port on the network switch is disabled (block 58).

When a calling party calls the user IP phone in this non-limiting example, a determination is made if a private branch exchange is in the network (block 60). If not, the process ends (block 62) because the calling party is not able to complete a call or leave a message or have a call forwarded to the user's mobile wireless communications device such as the user's mobile phone. If yes, however, the call is controlled by the PBX settings (block 64). A determination is made if the PBX is configured to forward calls to the wireless communications device such as the mobile phone of the user (block 66). If not, then the calling party can record a voice message by routing a call to voice mail (block 68). If yes, the call can be forwarded to the wireless communications device as the mobile phone of the user (block 70). By the switch port being disabled (as determined by the ping probe), there is no IP phone present on the network for the PBX to transfer the call to. The call is then controlled by the settings of the PBX. It can route the call to voice mail, or it can forward the call to the user's mobile phone (depending on how it is configured).

Different "network switches" are used in the communications system shown in FIG. 1. An example is a NetVanta series switch as manufactured by ADTRAN, INC. in which Ethernet "switch ports" are dynamically enabled and disabled based on tracks. In one aspect, a track is either in a "TRUE" or "FALSE" state based on a variety of inputs. One input to the track state is a probe packet such as described. The user configures a probe packet and if the probe packet succeeds and is returned positive, the track is considered in a "TRUE" state. The probe packet is performed or generated through the network on a user-configurable repetitive interval depending on user (or administrator) preferences. As long as the probe packet succeeds and is positive, the track will be "TRUE" and the switch port enabled.

User presence is detected by configuring a "ping," i.e., probe packet, to a user's wireless communications device. When the user carrying the device enters the vicinity and range of the network, such as a Wireless Local Area Network (WLAN), and the device of the user is configured to connect to this WLAN, the probe packet will succeed. When the user leaves the range of the WLAN, the "ping" or probe packet will fail. The successful "ping" or probe packet causes the track state to be "TRUE." The switch port connected to the user's office IP phone or similar PoE powered device is enabled only when the track is "TRUE" in this non-limiting example. When the track is "FALSE" corresponding to when the probe packet is returned negative, the switch port is disabled. If the user enters the range of the network, the "ping" or probe packet to the user's device succeeds. The track state changes to "TRUE" and the switch port is enabled for user operation. The IP phone or similar PoE powered device powers up and is enabled. If the user leaves the range of the network, the "ping" or probe packet to the user's device fails and the track state changes to "FALSE" and the switch port is disabled. The IP phone powers down and is disabled.

The "ping" or probe packet is also typically referred to as a "ping" and, in one non-limiting example, the packet is about 64 bytes and formed as an Internet Control Message Protocol (ICMP) packet having a header and various payload data. It typically resides on the network layer levels. For example, in a non-limiting aspect, a form of "echo request" is used as an ICMP message. In one example, if a calling party calls from outside the network when the switch port 18a is not enabled, a message is left at a Private Branch Exchange (PBX) 22, such as shown connected at the network. It is also possible for the PBX 22 to forward a voice mail or the call itself to the user's device such as the mobile phone. For example, if a user is temporarily out to lunch, the PBX could be configured to forward a voice message to the mobile device.

In one example, ICMP messages and "pings" as the probe packet are constructed at the IP layer such as from a normal IP datagram. The processing at the IP network layer can encapsulate the appropriate ICMP message with a new IP header.

Figure 3:
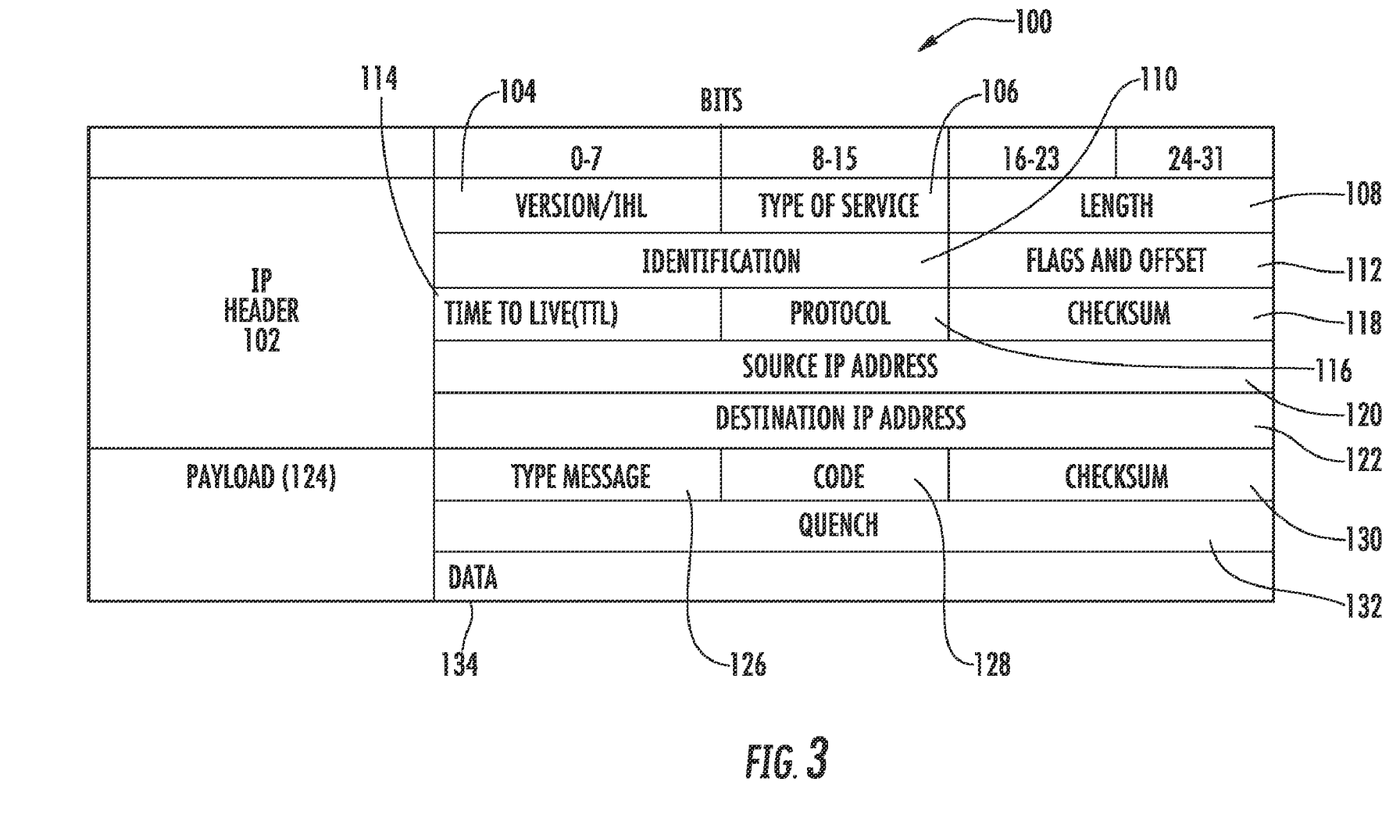
FIG. 3 is a diagram of a modified probe packet used as a "ping" in accordance with a non-limiting example.

FIG. 3 shows an example of a probe packet 100 (as an ICMP packet in this example). This implementation does not include any modifications to a standard "ping" packet. In some examples, however, it is possible to modify data. The presence of a user is detected and the action taken based on the presence of the user by shutting down the switch port to the IP phone or other powered device when the user is not detected. When the user is detected, the switch port is enabled. The probe packet as a "ping" is transmitted from the network such as originating from the network switch having the user's IP phone or other powered device connected thereto. If the user is detected indicating the presence of the user within the building or vicinity of the network, the switch port for the IP phone is enabled. It is possible for the data in this probe packet, in one example, to include additional instructions for determining whether the user's wireless communications device is in the vicinity of the network operating with the Wireless Access Point 14. Typically, the probe packet includes an IP header and the payload. It is possible for the data load in an example to include data for different types of answers and is arbitrary in length and left to the implementation details of the particular communications network such as that shown in FIG. 1. Typically, it is less than a maximum MTU of the communications network.

As shown in FIG. 3, a probe packet in this example is illustrated at 100 and includes the IP header 102. The IP header could be 160 bits or 20 bytes as an example and has the version/IHL 104, type of service 106 and length 108. Fields could be used for Identification 110 and Flags and Offset 112 and a Time-to-Live (TTL) 114, Protocol 116, Checksum 118, Source IP address 120, and Destination IP address 122. The payload 124 in this example could be about 64 or more bits, e.g., eight or more bytes, and includes fields for the Type of message 126, the Code 128, the Checksum 130, and a Quench 132 and Data 134. This is a preferred type of illustrated probe packet as a "ping." Other configurations are possible.

In one aspect, the message format includes an echo request in which data is expected to be received back as an echo reply ("ping"). Typically, an echo reply is a message generated in response to an echo request and is used with hosts, routers and similar network elements and devices. It is possible for the payload to include the data 134 with a time stamp as when the message was sent. Depending on implementation, it can be a contentless message such as a short or empty instant message, email, voice mail, "missed call" or other information that can be conveyed with a single bit of information at a given time and later processed.

Figure 4:
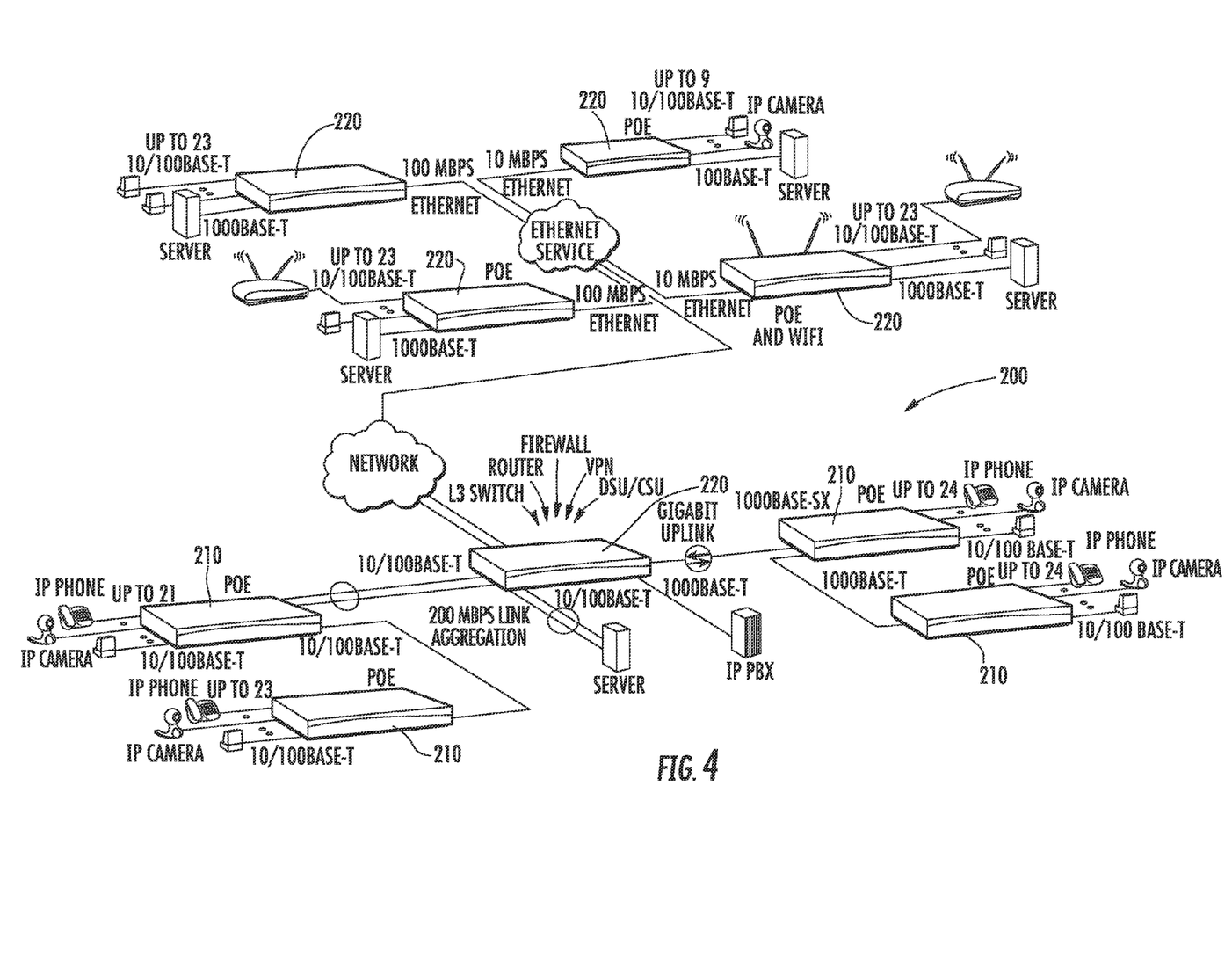
FIG. 4 is another more detailed representative example of a communications system that can use the method as described in accordance with a non-limiting example.

There now follows a general description of a communications system to show a network example to which the system and method for controlling the PoE powered device as described can be applied. FIG. 4 is a system diagram of a communications system 200 that includes various network elements and devices as shown in FIG. 1 and other interconnected platforms, switches and servers. It should be understood that the communications system 200 shown in FIG. 4 is only one non-limiting example of a communications system that can use methodology for the probe packet as described.

FIG. 4 shows the communications system that includes layer 2 and layer 3 network switching functionality. Typically, layer 2 switches can be provided such as the NetVanta 1200 and 1500 series switches 210 while layer 3 Ethernet switches can be provided, such as NetVanta 1300 series devices 220 as non-limiting examples. A example is the NetVanta 1335 and related series of devices. In FIG. 4, various devices such as a 1300 series devices by ADTRAN, INC. are illustrated and 1200 series devices by ADTRAN, INC. as layer 2 devices are illustrated in this non-limiting example.

Switches and other network devices as illustrated can run the ADTRAN Operating System (AOS) and provide standards-based, non-blocking switching and support for virtual LAN's (VLAN's), Quality of Service (QOS), and Class of Service (COS) for applications such as VoIP, link aggregation, advanced management and remote configuration capability and other functions. Example devices in some aspects are fully managed layer 2 and layer 3 fast Ethernet switches and include 802.3af Power over Ethernet (PoE) enabled capabilities. The quality of service capabilities support mission critical applications such as VoIP. A WiFi access controller can manage a plurality of Wireless Access Points (WAP's). Ethernet switches in an example support layer 2, 802.1p Class of Service (COS) and weighted round robin and strict priority queuing for traffic prioritization. At layer 3, a multi-service router in one example supports various markings and class-based weighted fair or low latency queuing.

In another example, layer 2 switches are stackable PoE switches with gigabit uplinks. In another non-limiting example, a Wireless Access Point (WAP) as described relative to the WAP 14 uses a NetVanta 150 wireless access point (WAP) or NetVanta 1335 with WiFi that provide 802.11a/b/g radio support and Virtual Access Points (VAP's) and segments wireless networks together. All-in-one switch-routers perform services such as switching, IP routing, firewall, Virtual Private Networking (VPN), and 802.11a/b/g WiFi in a single platform. A NetVanta 1335 series switch integrates in one example a modular IP access router and 24-port PoE layer 3 switch, firewall, VP and appliance and wireless access in a platform. Layer 2 switch-routers in other examples are all-in-one access platforms such as the NetVanta 1200 series switch-routers for a cost-effective, single box approach to Voice over IP (VoIP) migration. Layer 3 switching is provided in another example for VLAN trunking and VGRP for 802.1Q VLAN functionality and provide separation of broadcast domains and functional work areas.

Other communications servers are used in the illustrated networks of FIG. 4 such as a NetVanta 7000 series servers and devices (including NetVanta 7100 devices) as manufactured by ADTRAN, INC. of Huntsville, Ala. The communication servers are an all-in-one, office-in-a-box that provides voice and data solutions, including Private Branch Exchange (PBX) functionality. SIP communications are used in various remote sites having communications servers such as IP business gateways.

Communications servers in another example are formed as a single chassis and provide a LAN-to-WAN infrastructure and Quality of Service (QoS) that maintains voice quality and includes a Graphical User Interface (GUI) for network set-up and facilitate installation and system administration. In this example, a communications server allows a converged IP voice and data network with a full-function IP PBX for voice such as a NetVanta 7000 series. It includes an integrated Power Over Ethernet (POE) switch-router for data in an integrated device and a Virtual Private Network (VPN) for secure Internet tunnelling. The device enables VoIP by providing the appropriate functionality that includes SIP-based telephony features, voice mail, multi-level auto-attendant, caller ID name/number, and other features for a complete VoIP network. The device includes multi-site SIP networking and SIP trunking service. Various optional modules include T1 and ADSL Network Interface Modules (NIMs). Analog (FXS, FXO) Voice Interface Modules (VIMs) are included in another example with T1, PRI voice interface modules and fiber SFP modules.

A communications server, in another example, is an integrated communications platform and includes capability of a fast Ethernet switch with Gigabit uplinks and expansion slots for the network interface modules and voice interface modules. A IP telephone system as part of the communications network 200 as illustrated in an example includes voice mail and multi-level auto-attendant, caller ID name/number, COS, trunk groups, music-on-hold, sales-on-hold, overhead paging, and other call options, including call coverage lists, forwarding of calls to a cell phone and email notification of voice mail. Some devices operate as an integral SIP gateway with the appropriate FXS and FXO analog interfaces to support analog phones, fax machines, modems and credit card readers. An integrated voice mail includes 3,000 or more messages on eight ports and multi-level auto-attendant that are multi-level on eight ports such as in the example of a NetVanta 7000 series device. These devices include, in one example, a full function IP access router and an integrated state inspection firewall protects against the Denial-of-Service (DOS) attempts. The devices include IP Sec VP and tunnelling with DES/3DES/AES encryption and an SIP-aware firewall, and include T.38 support and a door relay, music-on-hold (MOH) interfaces and Voice Quality Monitoring (VQM).

In another example, SIP networking is supported between multiple locations. A business connects multiple sites and has three or four digit dialing and local call routing and survivability and on-net calls for toll bypass. Multiple SIP trunks allow a communications server to connect to other communication servers. Remote SIP trunks are supported and connect in one example to all endpoints at all locations such that a user has local voice mail and auto-attendant services. A hub and spoke SIP network are accomplished in another example. A dedicated communications server aggregates SIP trunks at a central location, which for qualified applications, increases the number of other communication servers that are networked together.

The user in another example uses an Internet Protocol (IP) phone such as an IP 700 series of telephones with different line versions and support multiple call functions. It is possible to incorporate voice mail-to-email applications and personal auto-attendant in which each phone sets up their own automatic attendant. It is also possible for the communications server to ring a series of stations and one external phone number. A communications server in another example includes a PC-based phone manager and it is possible to incorporate an Internet Protocol (IP) soft phone to enable VoIP communications from a Windows- or Vista-based laptop or desktop PC. Through a PC-based phone manager, a user can customize phone settings.

It is also possible for a communications server to work in a multi-vendor environment and with an integrated T1-PRI trunk to consolidate separate voice lines and Internet access onto a single T1 or PRI trunk. It is possible to combine the IP and analog communications and support analog trunks, analog phones, fax machines and credit card readers without the requirement for analog telephone adaptors. It is also possible to provide always-on, voice, data and high-speed data access to business resources from a remote home office using a single cable or DSL broadband connection in secure IP Sec-compliant VPN technology. A command line interface (CLI) can be used.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A method for controlling a powered device of a user that is connected to a communications network and draws power from the network, comprising:
    determining if the user is in the vicinity of the communications network by generating a probe packet to a wireless access point (WAP) of the communications network that is returned positive when a wireless communications device of the user that is configured to connect to the communications network via the WAP is connected thereto; and
    if the probe packet is returned positive indicative of the presence of the user, the switch port of a network switch connected to the powered device of the user is enabled to allow the powered device to draw power from the communications network.

2. The method according to claim 1, and further comprising disabling the switch port connected to the powered device when the probe packet is returned negative indicative that the user is not in the vicinity of the communications network.

3. The method according to claim 1, and further comprising generating the probe packet from the network switch having the switch port to which the powered device of the user is connected.

4. The method according to claim 1, wherein the network switch to which the powered device is connected comprises an Ethernet switch.

5. The method according to claim 1, wherein the powered device draws power from the communications network using Power over Ethernet (PoE) functionality.

6. The method according to claim 1, wherein the powered device of the user comprises an Internet Protocol (IP) phone.

7. The method according to claim 1, and further comprising enabling and disabling the switch port based on a track state in the network switch to which the powered device is connected.

8. The method according to claim 7, and further comprising creating a TRUE track state in the network switch to enable the switch port when a probe packet is returned positive.

9. The method according to claim 7, and further comprising creating a FALSE track state in the network switch to disable the switch port when the probe packet is returned negative.

10. The method according to claim 1, and further comprising generating the packet probe on a repeated interval that is user configurable.

11. A method for controlling an internet protocol (IP) phone of a user that is connected to a switch port of a network switch in an IP network and draws power therefrom comprising:
    determining if the user is in the vicinity of the IP network by generating a probe packet to a wireless access point (WAP) of the IP network that is returned positive when a wireless communications device of the user that is configured to connect to the IP network via the WAP is connected thereto; and
    if the probe packet is returned positive indicative of the presence of the user, the switch port connected to the IP phone of the user is enabled to allow the IP phone to draw power from the network, and if the probe packet is returned negative the switch port connected to the powered device is disabled; and
    receiving a call within the IP network to the IP phone of the user, wherein if the switch port to which the IP phone is disabled, receiving the call into a private branch exchange (PBX).

12. The method according to claim 11, and further comprising routing the call intended for the IP phone of the user to the mobile device of the user or to voice mail.

13. The method according to claim 11, and further comprising forwarding the call using the PBX, including any stored voice messages.

14. The method according to claim 11, wherein the network switch port to which the IP phone is connected comprises an Ethernet switch port.

15. The method according to claim 14, wherein the IP phone draws power from the network using power over Power over Ethernet functionality (PoE).

16. The method according to claim 11, and further comprising enabling and disabling the network switch port based on a track state in the network switch.

17. The method according to claim 16, and further comprising creating a TRUE track state in the network switch to enable the network switch port when the probe packet is returned positive.

18. The method according to claim 16, and further comprising creating a FALSE track state in the network switch to disable the network switch port when the probe packet is returned positive.

19. The method according to claim 11, and further comprising generating the probe packet on a repeated interval that is configurable.

20. A communications system, comprising:
- a plurality of network elements interconnected together and configured to form a communications network;
- a wireless access point (WAP) connected to said communications network and configured to communicate with a wireless communications device of a user; and
- one of said network elements comprising a power sourcing network switch having a switch port configured to connect to a powered device of the user that draws power from the communications network through the switch port, wherein a network, element is configured to generate a probe packet to the wireless access point (WAP) of the communications network that is returned positive when a wireless communications device of the user that is configured to connect to the communications network via the WAP is connected thereto, wherein if the probe packet is returned positive indicative of the presence of the user, the power sourcing network switch enables the switch port connected to the powered device of the user to allow the powered device to draw power from the network.

21. The communications system according to claim 20, wherein if the probe packet is returned negative, said power sourcing network switch disables the switch port.

22. The communications system according to claim 20, wherein a powered device of the user comprises an IP phone.

23. The communications system according to claim 22, and further, comprising a Private Branch Exchange (PBX) connected to said communications network and configured to receive an incoming call intended to the IP phone of the user when the switch port has been disabled.

24. The communication system according to claim 23, wherein said PBX is configured to forward the incoming call to the wireless communications device of the user.

25. The communications system according to claim 20, wherein said IP communications network comprises a Local Area Network (LAN).

26. The communications system according to claim 20, wherein said power sourcing network switch comprises TRUE and FALSE track states configured with the switch port to enable and disable the switch port.

27. The communications system according to claim 26, wherein said power sourcing network switch has a TRUE track state configured for the switch port when the probe packet is returned positive.

28. The communications system according to claim 26, wherein said power sourcing network switch has a FALSE track state configured for the switch port when the probe packet is returned negative.

29. The communications system according to claim 20, wherein said power sourcing network switch is configured to generate the probe packets.

30. The communications system according to claim 29, wherein said power sourcing network switch is configured to generate the packet probe on a repeated interval that is configurable.

31. The communications system according to claim 20, wherein said power sourcing network switch comprises a switch having Power over Ethernet (PoE) functionality.

* * * * *